(12) United States Patent
Strong et al.

(10) Patent No.: US 8,500,196 B2
(45) Date of Patent: Aug. 6, 2013

(54) CHILD SEAT HAVING A CRUSH ZONE

(75) Inventors: L. Curtis Strong, Rock Hill, SC (US); Christopher Glenn Franck, Fort Mill, SC (US); Ronald M. Marsilio, Lake Wylie, SC (US)

(73) Assignee: Britax Child Safety, Inc., Fort Mill, SC (US)

( * ) Notice: Subject to any disclaimer, the term of this patent is extended or adjusted under 35 U.S.C. 154(b) by 467 days.

(21) Appl. No.: 12/424,127

(22) Filed: Apr. 15, 2009

(65) Prior Publication Data
US 2009/0256404 A1 Oct. 15, 2009

Related U.S. Application Data

(60) Provisional application No. 61/045,022, filed on Apr. 15, 2008.

(51) Int. Cl.
*B60N 2/42* (2006.01)

(52) U.S. Cl.
USPC .................. 297/216.11; 297/216.15

(58) Field of Classification Search
USPC .............. 297/216.11, 216.15, 216.14, 216.13
See application file for complete search history.

(56) References Cited

U.S. PATENT DOCUMENTS

| | | | | |
|---|---|---|---|---|
| 3,833,946 A | * | 9/1974 | Von Wimmersperg | 5/94 |
| 4,057,214 A | | 11/1977 | Harder, Jr. | |
| 4,402,548 A | * | 9/1983 | Mason | 297/464 |
| 5,290,089 A | * | 3/1994 | Oleszko et al. | 297/216.14 |
| 5,383,708 A | * | 1/1995 | Nagasaka et al. | 297/250.1 |
| 5,468,053 A | * | 11/1995 | Thompson et al. | 297/472 |
| 5,664,830 A | * | 9/1997 | Garcia et al. | 297/216.11 |
| 5,722,719 A | * | 3/1998 | Glomstad | 297/216.11 |
| 5,810,435 A | * | 9/1998 | Surot | 297/250.1 |
| 5,961,143 A | * | 10/1999 | Hlywka et al. | 280/728.3 |
| 5,961,182 A | | 10/1999 | Dellanno | |
| 6,058,529 A | * | 5/2000 | Goysich | 5/94 |
| 6,142,563 A | | 11/2000 | Townsend et al. | |
| 6,189,970 B1 | * | 2/2001 | Rosko | 297/250.1 |
| 6,561,580 B1 | * | 5/2003 | Bergey | 297/216.1 |
| 6,669,288 B2 | * | 12/2003 | Nakagawa et al. | 297/256.16 |
| 6,921,133 B2 | * | 7/2005 | Taoka et al. | 297/216.16 |
| 6,964,451 B1 | * | 11/2005 | Bergey | 297/216.1 |
| 7,303,229 B2 | * | 12/2007 | Fujita et al. | 297/216.14 |
| 7,390,064 B2 | * | 6/2008 | Horton et al. | 297/472 |
| 7,472,952 B2 | * | 1/2009 | Nakhla et al. | 297/216.11 |
| 7,506,929 B2 | * | 3/2009 | Fransen et al. | 297/250.1 |
| 7,740,313 B1 | * | 6/2010 | Hei et al. | 297/219.12 |
| 7,841,620 B2 | * | 11/2010 | Kai et al. | 280/728.3 |
| 8,132,862 B2 | * | 3/2012 | Yamada et al. | 297/452.2 |
| 8,138,908 B2 | * | 3/2012 | Rajasingham | 340/461 |
| 8,146,988 B2 | * | 4/2012 | Mowry et al. | 297/216.1 |
| 2004/0095004 A1 | * | 5/2004 | Horton et al. | 297/250.1 |

(Continued)

*Primary Examiner* — David E Allred
(74) *Attorney, Agent, or Firm* — Alston & Bird LLP

(57) ABSTRACT

A child safety seat is provided. The safety seat includes a generally L-shaped shell having a seat bottom and a seat back, a harness assembly carried by the shell for restraining an occupant in the seat, a restraining member for receiving a latching assembly for securing the safety seat into a support position on a vehicle seat in a manner, and at least one area of predetermined reduced material thickness formed into the shell in the rearward portion of the seat bottom. The area of reduce material thickness defines a crush zone of reduced capacity to resist a downward movement-induced load on the seat bottom indicative of the sudden forward travel deceleration of the vehicle.

20 Claims, 13 Drawing Sheets

U.S. PATENT DOCUMENTS

| | | | |
|---|---|---|---|
| 2005/0110316 A1* | 5/2005 | Perrotti | 297/250.1 |
| 2007/0057544 A1* | 3/2007 | Nakhla et al. | 297/250.1 |
| 2007/0228802 A1* | 10/2007 | Nakhla | 297/469 |
| 2008/0012401 A1* | 1/2008 | Amesar et al. | 297/216.11 |
| 2008/0106129 A1* | 5/2008 | Nakhla et al. | 297/216.13 |
| 2010/0276972 A1* | 11/2010 | Dickinson et al. | 297/216.11 |
| 2011/0062756 A1* | 3/2011 | Campbell et al. | 297/250.1 |
| 2012/0049602 A1* | 3/2012 | Kaessner | 297/451.7 |

* cited by examiner

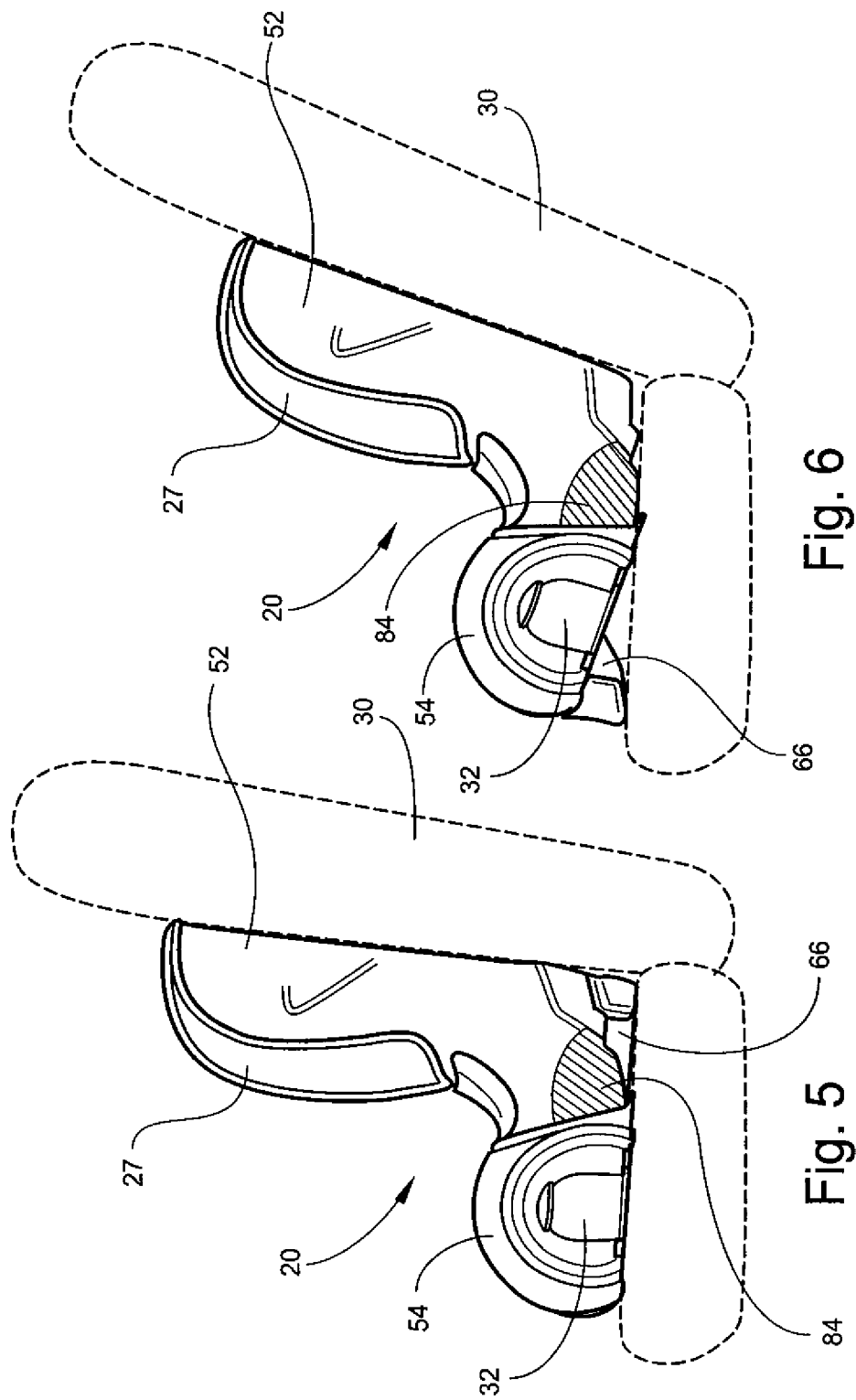

CHILD SEAT HAVING A CRUSH ZONE

PRIORITY CLAIM

This application claims priority to U.S. Provisional Patent Application No. 61/045,022 filed on Apr. 15, 2008, and incorporates by reference all of the subject matter disclosed therein.

BACKGROUND OF THE INVENTION

This invention relates generally to child restraint systems, and more particularly, to a child seat including a crush zone for absorbing impact energy.

A child restraint system, commonly referred to as a child car seat, child safety seat or simply child seat, is used for transporting and safely restraining a child within a vehicle so as to minimize the risk of injury to the child in the event of an abrupt movement or a collision involving the vehicle. Safety is of utmost concern in the design of a child seat. Conventionally, child seats have been made for infants and young children weighing less than about 45 pounds. However, as the safety advantages of the child seats and the associated safety harnesses become better known, there is an increased need in a child seat for older children of up to 80 or 100 pounds in weight.

The structural requirements of the child seat typically vary insubstantially from child to child within a relatively small weight range. As a result, conventional child seats are configured to contain children having similar sizes. In contrast, the structural requirements for containing children weighing about 80 pounds is significantly different from those weighing about 25 pounds. Therefore more than one child seat would have to be purchased for a child as they grow from about 25 pounds to about 80 pounds.

Accordingly, it is recognized that a specific need exists for a child seat that is configurable to address the aforementioned concerns. More particularly, there is a specific need for a child seat that is easily configurable to contain a child as that child grows from about 25 pounds to about 80 pounds. There is a specific need for a child seat that can be configured to protect a small child from the impact of a crash and easily reconfigured to protect a much larger child from the impact of a crash.

BRIEF SUMMARY OF THE INVENTION

Therefore, it is an object of the invention to provide a child safety seat that is adapted for use for different weight children.

It is another object of the invention to provide a child safety seat that is adapted to absorb energy occurring during an impact.

It is another object of the invention to provide a visual indicator that the child safety seat needs to be replaced because of an impact.

It is another object of the invention to provide a child safety seat having a controlled crush rate.

These and other objects of the invention are disclosed below in connection with a child safety seat having a generally L-shaped shell having a seat bottom and a seat back, a harness assembly carried by the shell for restraining an occupant in the seat, a restraining member for receiving a latching assembly for securing the safety seat into a support position on a vehicle seat in a manner whereby, upon a sudden forward travel deceleration of the vehicle, the seat back of the safety seat translates forward and the seat bottom of the safety seat translates downward toward the vehicle seat, and at least one area of predetermined reduced material thickness formed into the shell in the rearward portion of the seat bottom and defining a crush zone of reduced capacity to resist a downward movement-induced load on the seat bottom indicative of the sudden forward travel deceleration of the vehicle, whereby the material in the crush zone crushes at a controlled rate for reducing the load that would otherwise be transmitted to the seat occupant.

According to another embodiment of the present invention, the crush zone further defines a first crush region formed about an opening on a bottom surface of the seat bottom for receiving the harness assembly.

According to another embodiment of the present invention, the first crush region has a thickness between about 0.020 inches and about 0.065 inches.

According to another embodiment of the present invention, the first crush region has a thickness between about 0.025 inches and about 0.060 inches.

According to another embodiment of the present invention, the first crush region has a thickness between about 0.030 inches and about 0.055 inches.

According to another embodiment of the present invention, the crush zone further defines a second crush region on an outwardly facing side of the seat bottom.

According to another embodiment of the present invention, the shell is blow molded.

According to another embodiment of the present invention, the restraining member comprises a pair of laterally spaced apart openings in the shell for cooperatively receiving a vehicle seat belt therethough.

According to another preferred embodiment, a child safety seat is provided and includes a shell having a seat bottom and an attached seat back, a harness assembly carried by the shell for restraining a child in the seat, means for receiving a latching assembly for securing the safety seat to a vehicle seat, and an area of reduce material thickness formed in a rearward portion of the seat bottom and defining a crush zone for resisting a generally downwardly extending force occurring during an impact.

According to another embodiment of the present invention, the means for receiving a latching assembly comprises a pair of laterally spaced apart openings in the shell for cooperatively receiving a vehicle seat belt therethough.

According to another preferred embodiment, a shell for a child safety seat is provided and includes a seat bottom and an attached seat back, and an area of reduce material thickness formed in a rearward portion of the seat bottom and defining a crush zone for resisting a generally downwardly extending force occurring during an impact.

BRIEF DESCRIPTION OF THE DRAWINGS

The subject matter that is regarded as the invention may be best understood by reference to the following description taken in conjunction with the accompanying drawing figures in which:

FIG. 5 is a side view of the child seat of FIG. 1 in a first non-inclined position.

FIG. 6 is a side view of the child seat of FIG. 5 in a second inclined position.

DETAILED DESCRIPTION OF THE INVENTION

Figure 1:
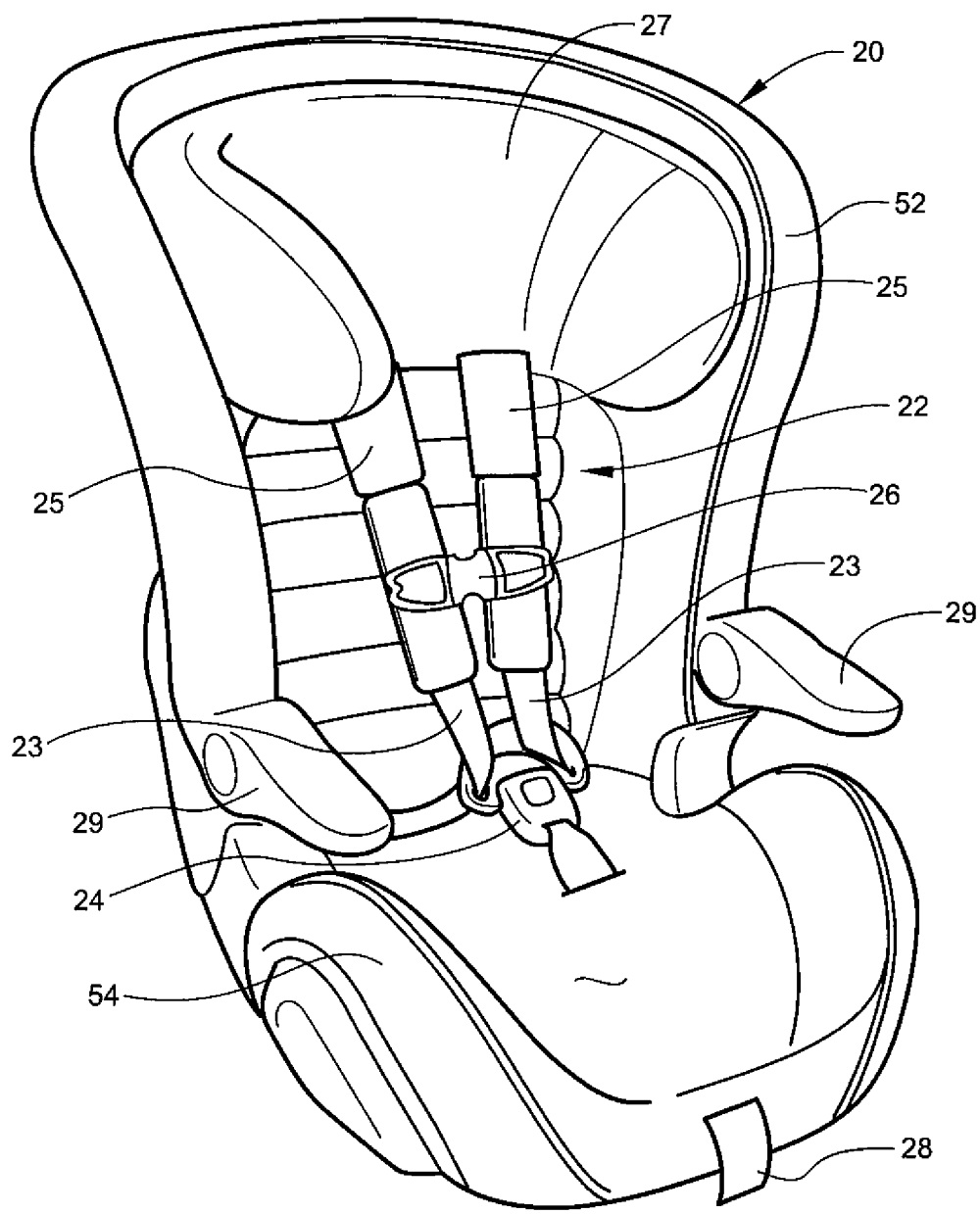
FIG. 1 is an perspective three-dimensional rendering of a child seat according to one embodiment of the present invention.

Referring to the drawings wherein identical reference numerals denote the same elements throughout the various views, a child restraint system, indicated generally at 20, and commonly referred to as a child car seat, child safety seat, or child seat, is shown in FIG. 1. By way of example only, the child seat 20 shown and described herein is a forward-facing child seat of the type typically used to transport and safely restrain children over the age of 1 year, less than about 49 inches (124 cm) in height, and weighing between about 20 pounds (about 9 kg) and about 100 pounds (about 45 kg).

In one embodiment, the child seat 20 is of a single-piece construction and is configured to be secured onto a seat within a vehicle by a vehicle seat belt or a tether that is attachable to an anchor ring formed in the vehicle. Alternatively, the child seat 20 can be a two-piece construction that includes a base and a seat portion configured to be mounted to the base. The base is configured to be secured onto a seat within a vehicle by a vehicle seat belt and the seat portion is pivotally mountable on the base such that the seat portion is movable between different recline positions. In addition, the child seat 20 may be a two-piece forward-facing child seat, commonly referred to as a child booster seat, of the type that includes a base and a seat portion adapted to be mounted on the base. Preferably, the child seat 20 is made from a relatively hard, rigid plastic or composite material, and is secured onto a seat within a vehicle by a conventional vehicle seat belt, such as a lap belt or combination lap belt and shoulder harness.

In the exemplary embodiment shown, the child seat 20 defines a seat area 21 for seating a child and comprises a child seat harness 22 for restraining the child within the seat area. The harness 22 comprises a pair of adjustable shoulder and chest straps 23 that are secured to a fixed length harness buckle 24 by conventional tongues or clasps (not shown) provided on the shoulder and chest straps. The harness 22 may also comprise a pair of shoulder pads 25 and a chest clip 26 for providing additional comfort and security. Other pads, such as head and thigh pads, may be provided for additional comfort, and a removable fabric cover 27 may be placed over the child seat 20 to alleviate temperature extremes and to shield the finish of the child seat from spills and stains. The child seat 20 further comprises an adjustment strap 28 for adjusting the length (i.e. tension) of the shoulder and chest straps 23 of the harness 22 to properly fit the size of a child seated within the seat area 21. In particular, the adjustment strap 28 may be extended (i.e. pulled) to shorten (i.e. tighten) the harness 22 around the child. If desired, the child seat 20 may be fitted with armrests 29 configured to rotate upwardly for easier entry into and exit from the seat area 21.

Figure 2:
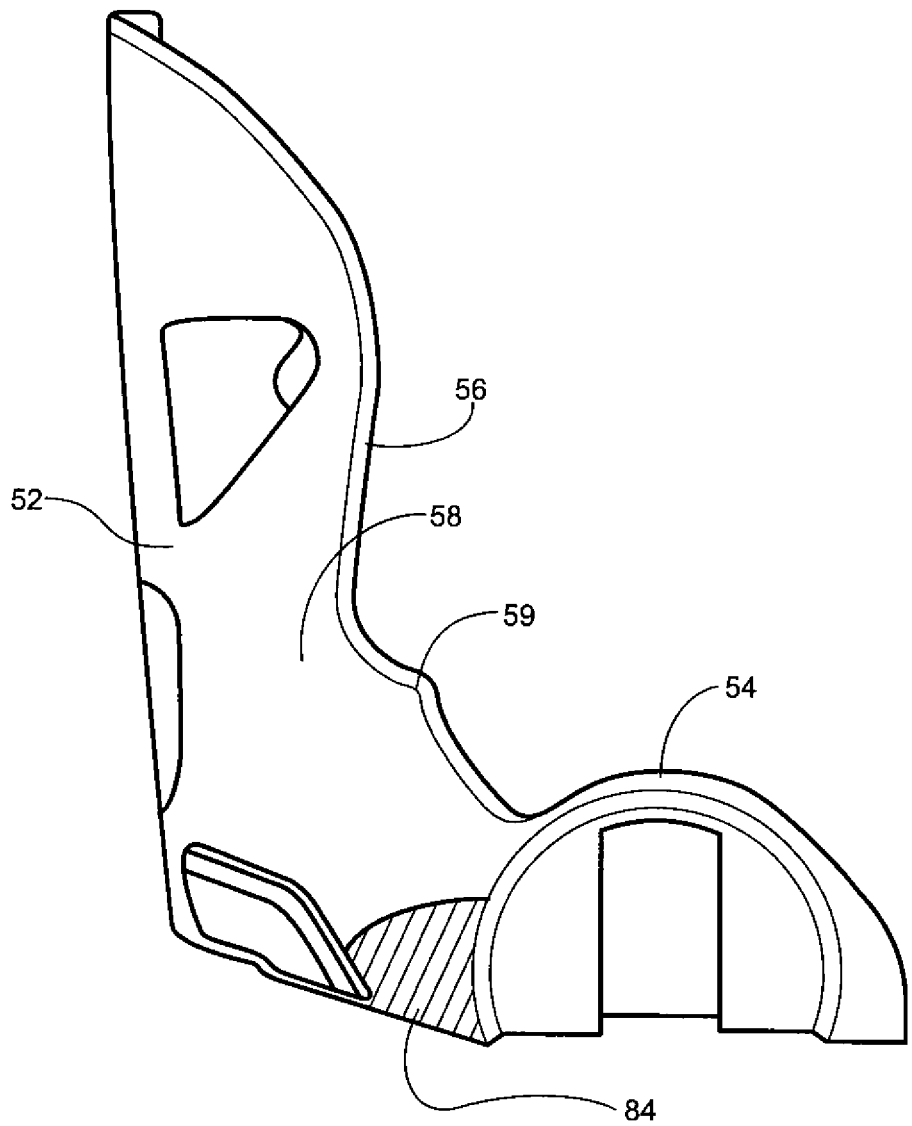
FIG. 2 is a side view of a shell of the child seat of FIG. 1.

Referring now to FIGS. 1 and 2, the child seat 20 includes a shell having a back 52 and a seat bottom 54. In one embodiment, the back 52 and the seat bottom 54 are integrally formed in a blow molding process. As used herein, the term "integrally formed" refers to components that are manufactured in the same process step such that they are joined together. It should be appreciated that the back 52 and the seat bottom 54 could be manufactured separately and subsequently assembled together to form the child seat 20. In preferred embodiments, the thickness of the top wall 56 and the bottom wall 58 is preferably between about 0.100 and 0.400 inches, more preferably between about 0.150 and 0.350 inches, and even more preferably between about 0.180 and 0.220 inches.

Figure 3:
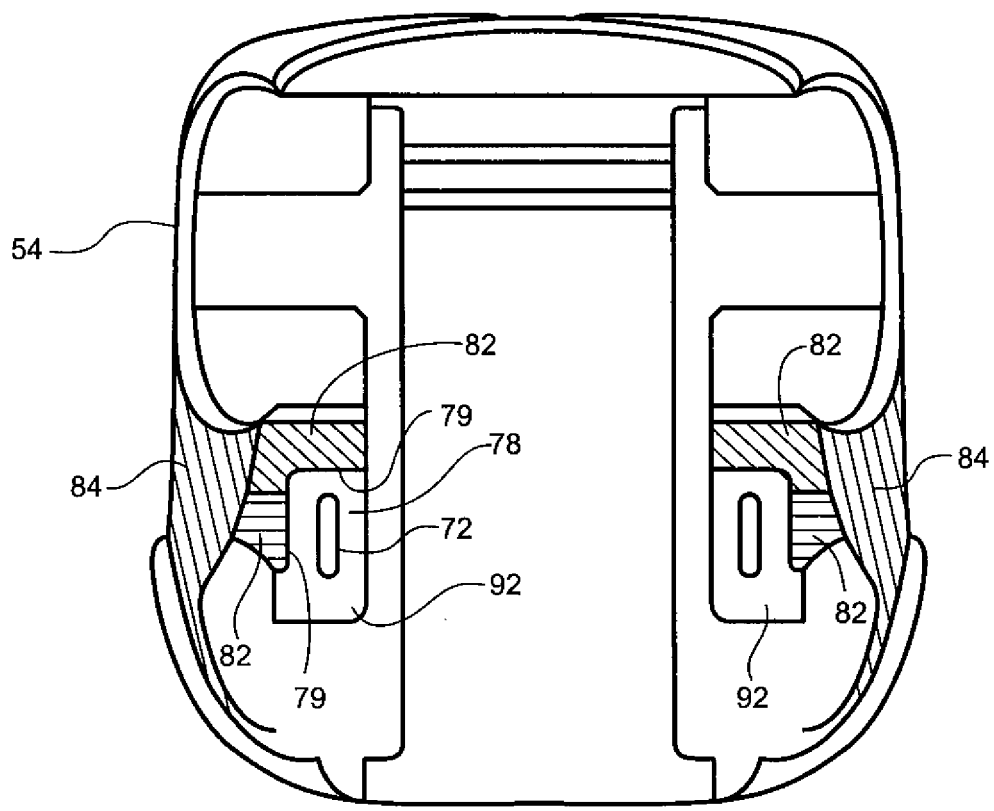
FIG. 3 is a bottom view of the shell of FIG. 2.

Referring to FIGS. 2 and 3 showing side and bottom views of the seat 20 respectively, it should be appreciated that child seat 20 is generally symmetrical and that a description of features positioned on one side of the seat can be used to understand corresponding features formed on the other side of the seat. In one embodiment, a recessed area 92 is defined by the bottom wall of the seat 20. Recess 92 has a slot 72 formed therein for receiving an end of the harness 22 therethrough. An end stop 76 is fitted to the end of the harness and is configured to engage an end stop region 78 defined around the slot 72 thereby preventing the end from passing through the slot 72.

The wall thickness of the end stop region 78 is chosen such that end generally does not pull into or through slot 72 during normal use or an impact such as a vehicle crash. A first crush region 82 is defined near the slot 72 such that in the illustrated embodiment, at least a portion of the end stop region 78 is positioned between the first crush region 82 and the slot 72. The thickness of the wall in the first crush region 82 is preferably between about 0.020 inches and about 0.065 inches; more preferably about 0.025 inches and 0.060 inches; and even more preferably between about 0.030 inches and 0.055 inches. This thickness is usually of a smaller amount than the remaining portions of the seat shell.

The first crush region 82 is configured such that during an impact event, or crash of the vehicle, energy that would otherwise be transmitted to a child seated within the child seat 20 is absorbed by the first crush region 82. It is believed that one mechanism by which the first crush region 82 absorbs energy is that it deforms, i.e., folds, crumples, tears, or the like, when exposed to a first predetermined amount of force. It should be appreciated that the end stop region 78 could also be configured to deform when exposed to the first predetermined amount of force or a second predetermined amount of force. In other words, the crush region 82 could overlap the end stop region 78 such that the wall thickness in the overlap area is uniform or gradually transitions from a first thickness in crush region 82 to a second thickness in end stop region 78.

In one embodiment, a second crush region 84 is positioned as shown in FIG. 2 on the side of the child seat and has a thickness that is within the ranges of thickness of the first crush region 82 as described above. It should be appreciated that the first crush region 82 and the second crush region 84 can be contiguous or can be separated by a region having a thicker wall thickness. In one embodiment, only the second crush region is present. It should also be appreciated that the wall thickness of the outer wall of the seat bottom 54 portion of the shell can transition gradually from the thickness near the parting seam 59 to the crush region 84. The first crush region 82 and the second crush region 84 are configured for cooperatively forming a controlled rate of crushing. In this manner, the first crush region 82 may be configured for relatively fast crushing under a relatively smaller downward movement-induced load, whereas the second crush region 84 may be configured for relatively slower crushing under a relatively larger downward-induced load. Cooperatively, the first crush region 82 and the second crush region 84 combine to form a crush zone having a predetermined reduced material thickness.

The present invention can be better understood with regard to a description of its operation as follows. During normal use, a child is positioned within child seat 20 and harness 22 is fastened securely. During a head-on collision, the child remains fastened within the child seat 20. The harness 22 pulls tight such that the end stop rests against the end stop region 78, thereby preventing the end stop from pulling through the bottom wall of the seat child seat 20. It is believed that the first and second crush regions 82, 84 are crushed as the result of the following mechanism.

The child seat translates forward after the harness 22 pulls tight such that a force is transmitted upward through the seat bottom 54. When the force reaches a predetermined minimum force, the first and second crush regions 82, 84 collapse, i.e., crush, and the force that would have otherwise been transmitted through the seat bottom 54 and into the child is absorbed by the first and second crush regions 82, 84. Upon a sudden forward travel deceleration of the vehicle, the seat back 52 of the child seat 20 translates forward and the seat bottom of the safety seat translates downward toward the vehicle seat.

Figure 4:
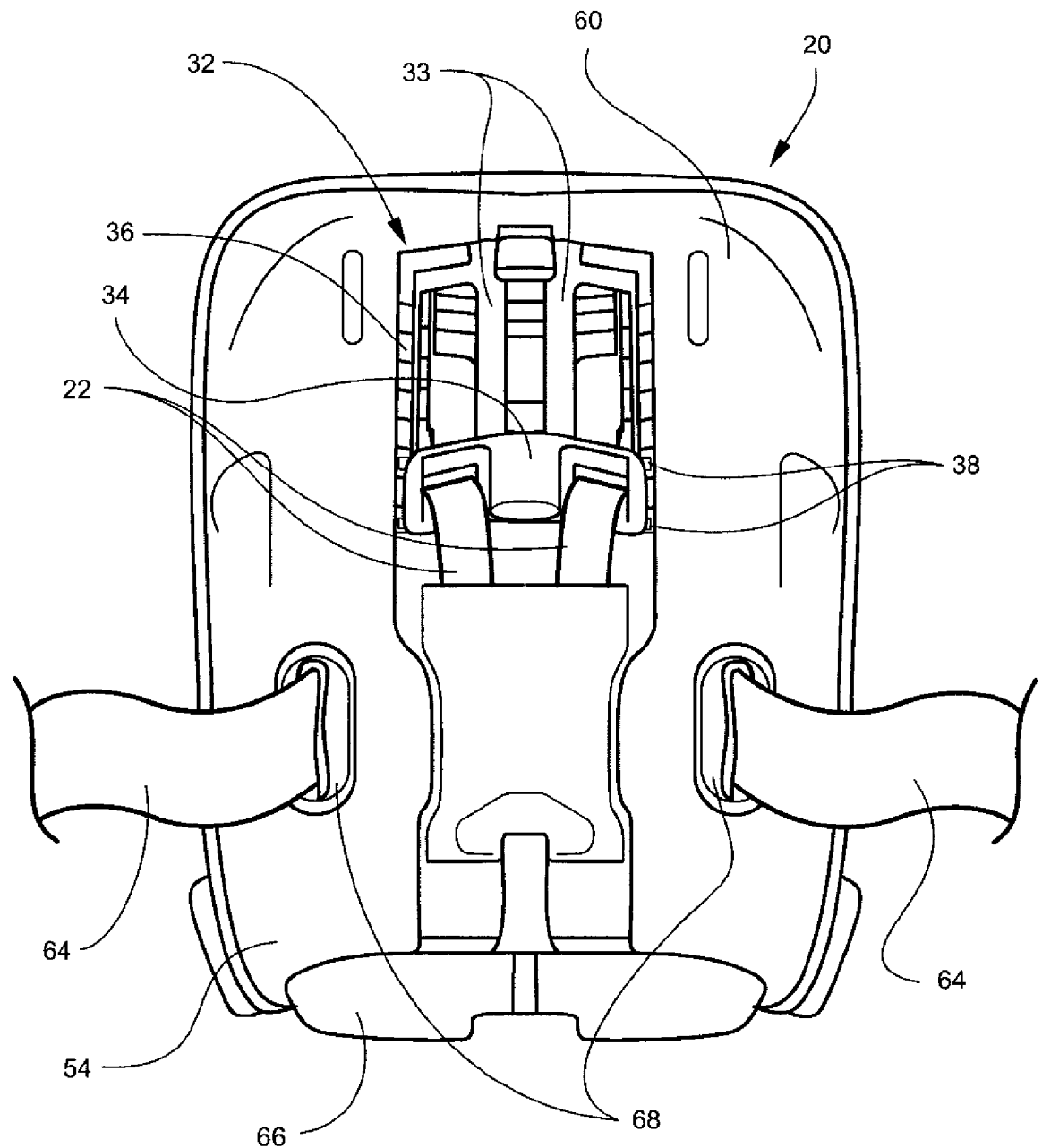
FIG. 4 is a rear view of the shell of FIG. 2.

As shown in FIG. 4, a restraining member or means for receiving a latching member are provided. These means include a pair of spaced-apart openings 62 formed on a back side 60 of the child seat 20. The pair of spaced-apart openings 62 are operable to receive a belt 64 of the vehicle seat, or may receive a belt attached to an isofix latch known in the art. The belt 64 is installed by inserting one end through a first opening of the pair of spaced-apart openings 62 and then, by reaching underneath the fabric cover 27 on the front of the seat 20, the belt 64 is fed out through the second opening of the pair of spaced apart openings 62. A pivotable platform 66 may be provided on the seat bottom 54 for varying the incline of the seat 20, but is not essential for patentability and will not be further described.

As shown in FIGS. 5 and 6, the child safety seat 20 is mounted on a vehicle seat 30. The embodiment shown in FIGS. 5 and 6 represents a more commercialized finish and includes a cup holder 32 that will not be described in further detail. The pivotable platform 66 is provided and is generally pivotable such that when the pivotable platform 66 is flipped in its biased first position, the child safety seat 20 is shown generally flat relative to the vehicle seat 30. When the pivotable platform 66 is flipped forward as shown in FIG. 6, the child safety seat 20 takes on a second inclined position relative to the vehicle seat 30.

Figure 7:
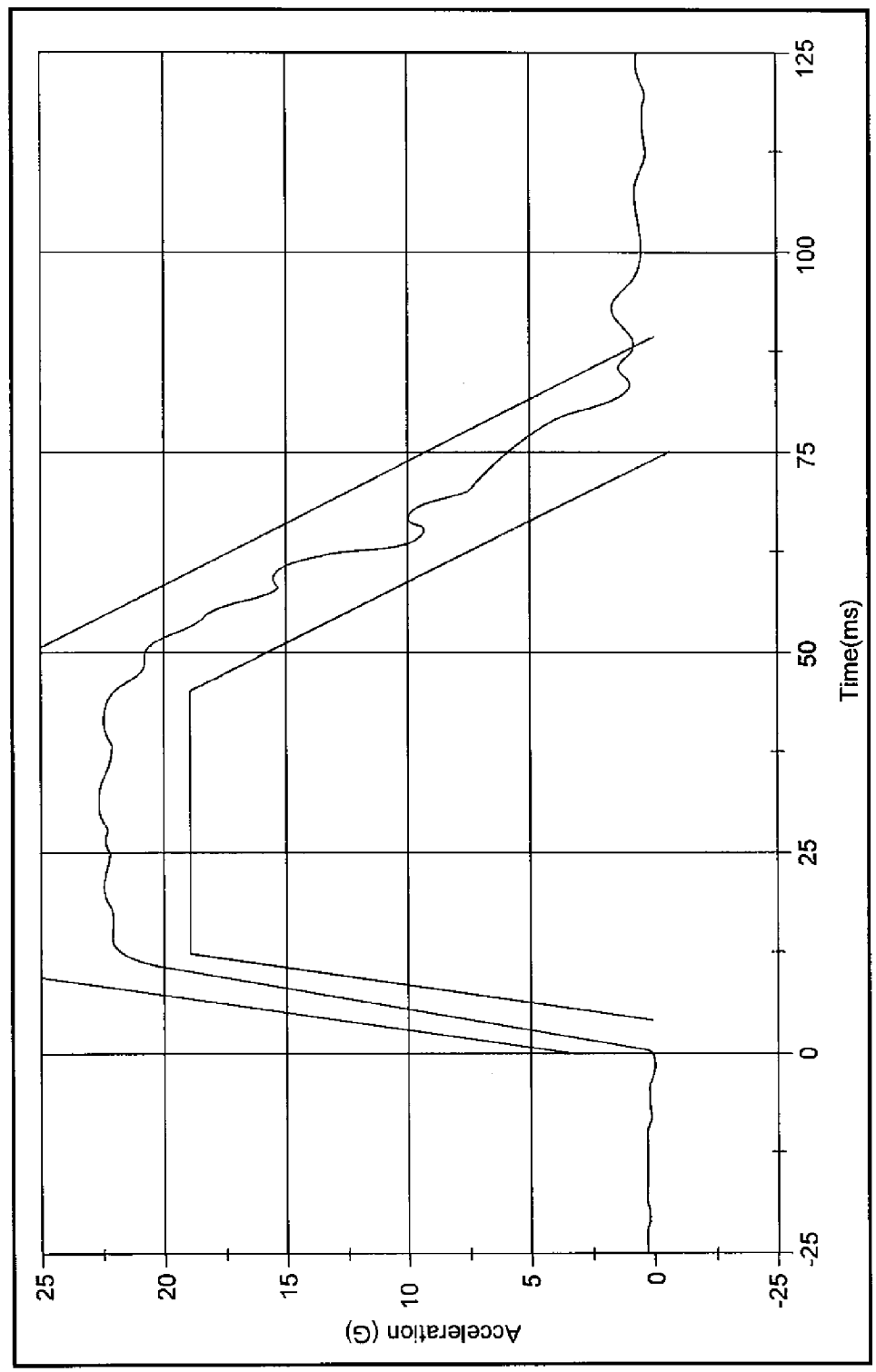
FIGS. 7-10 show graphs depicting actual crash-test data obtained using a child seat of the prior art.
Figure 8:
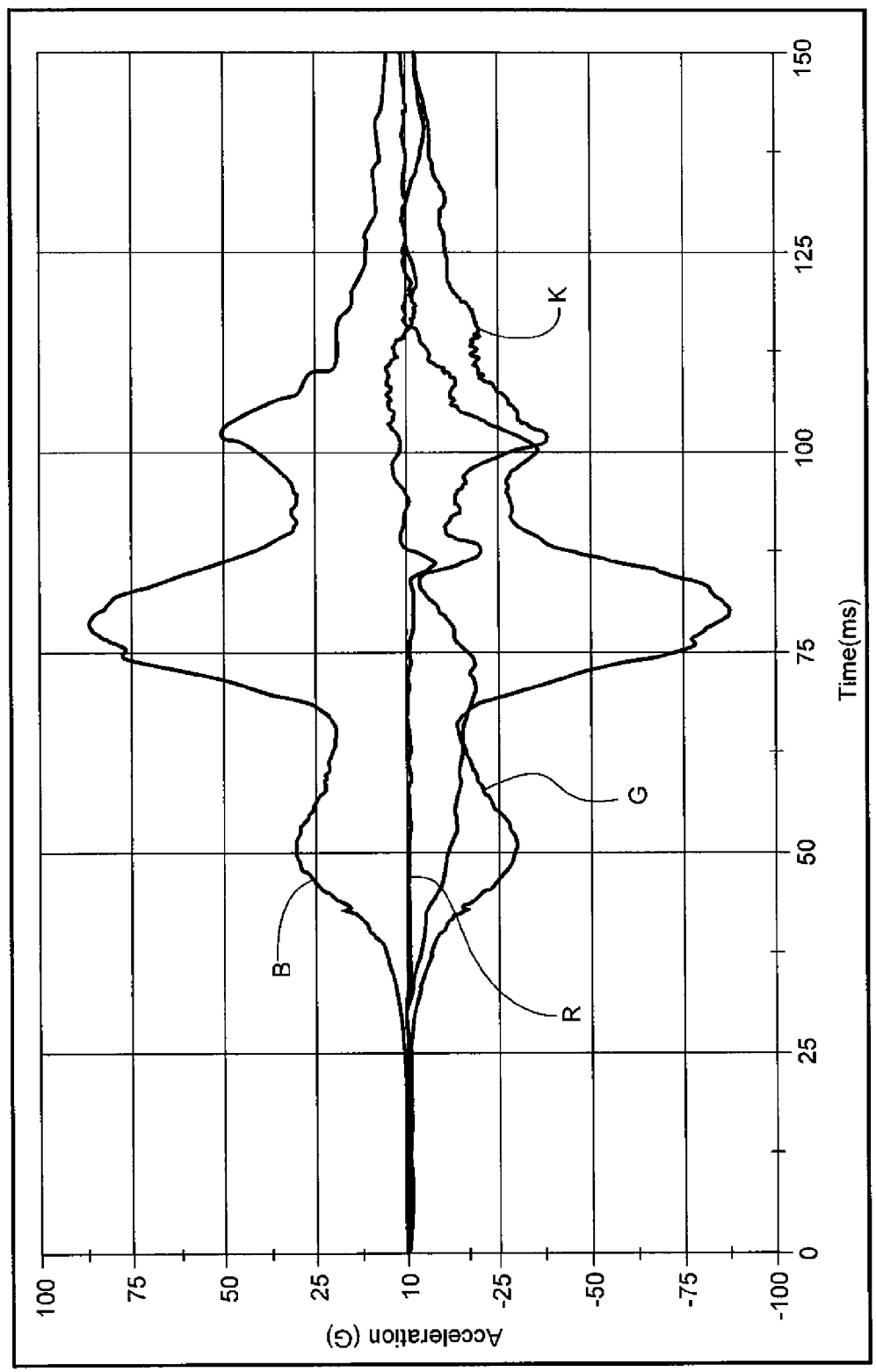
Figure 9:
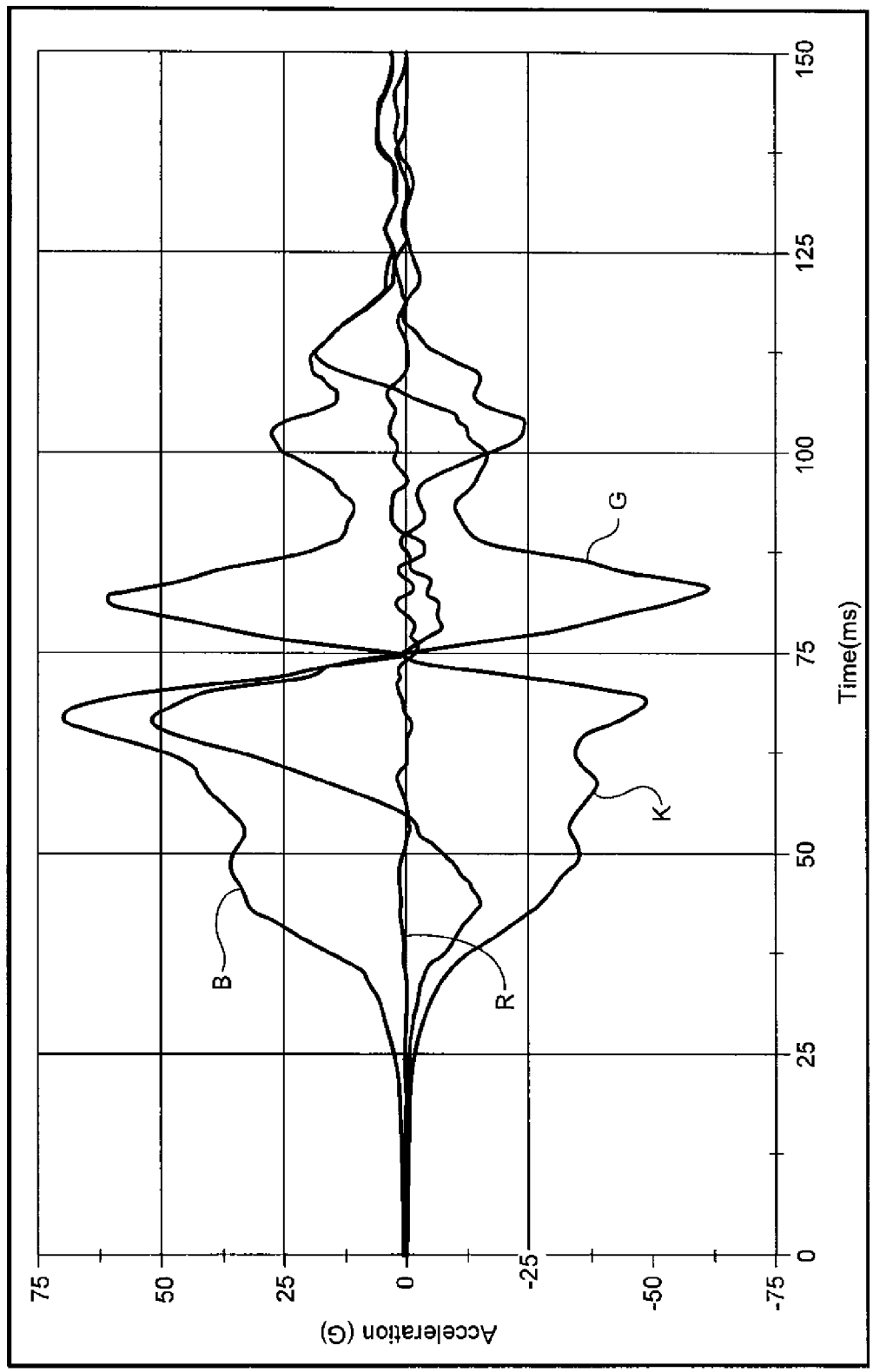
Figure 10:
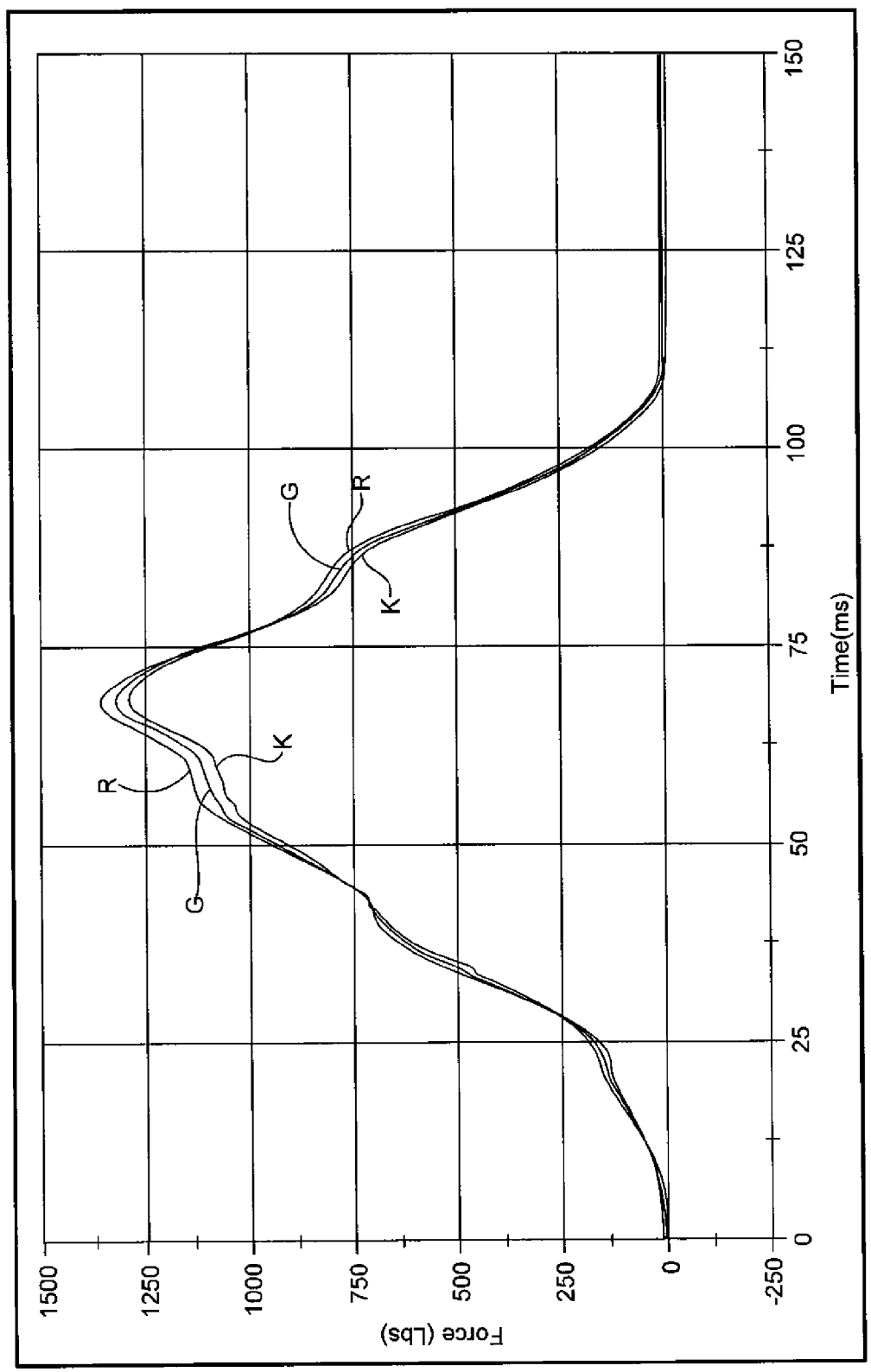
Figure 11:
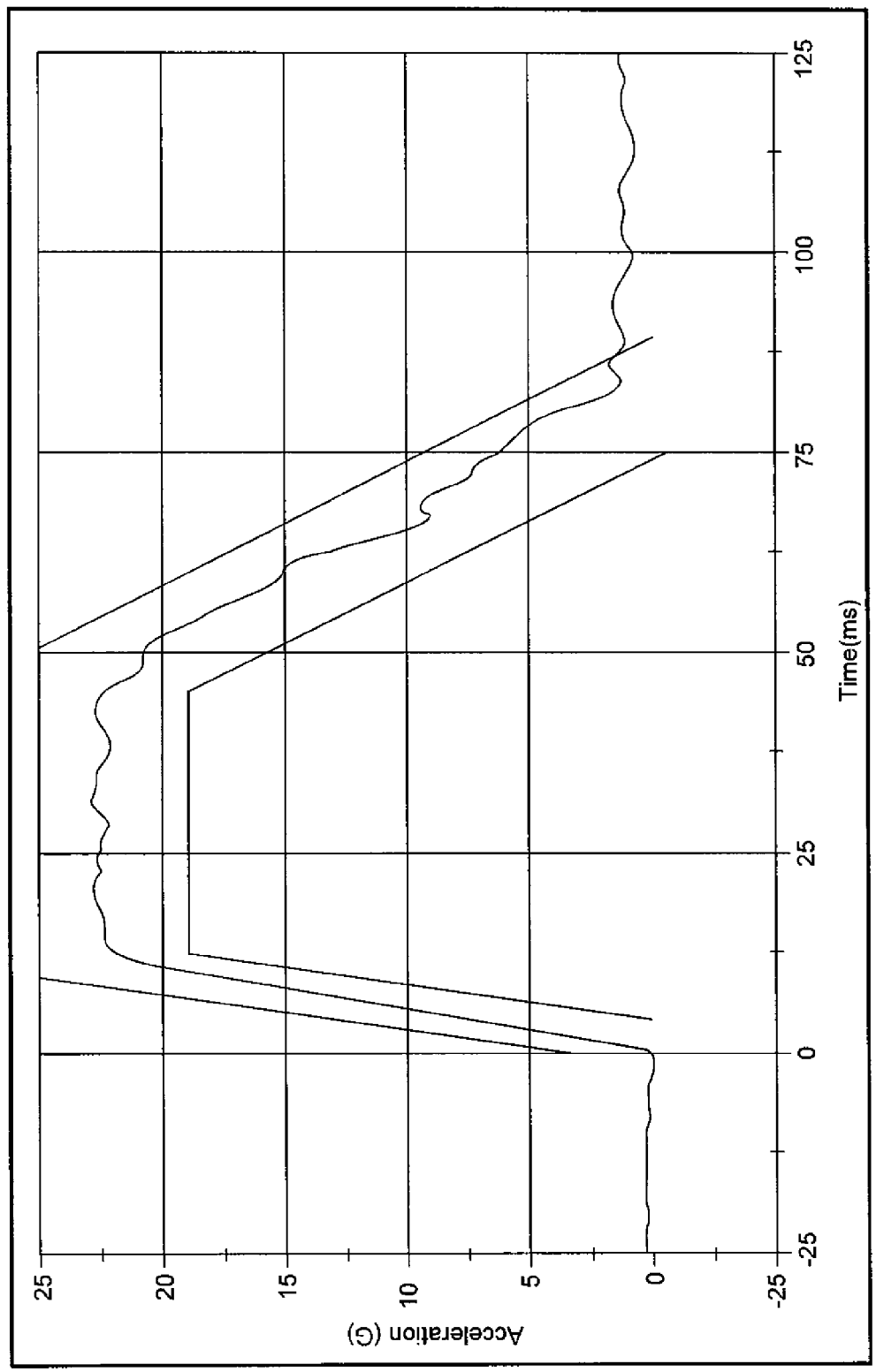
FIGS. 11-14 show graphs depicting actual crash-test data obtained using a child seat of the present invention.
Figure 12:
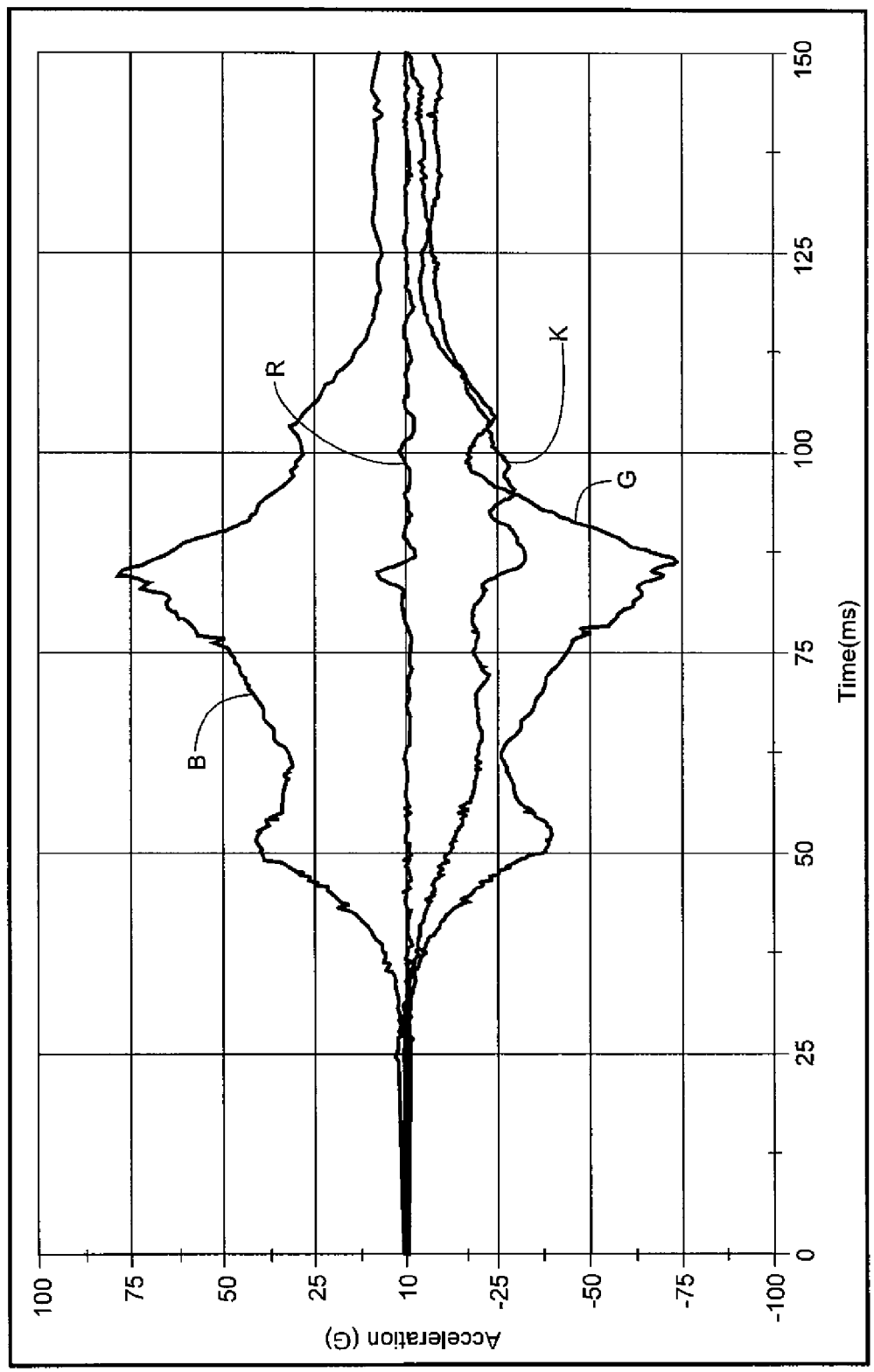
Figure 13:
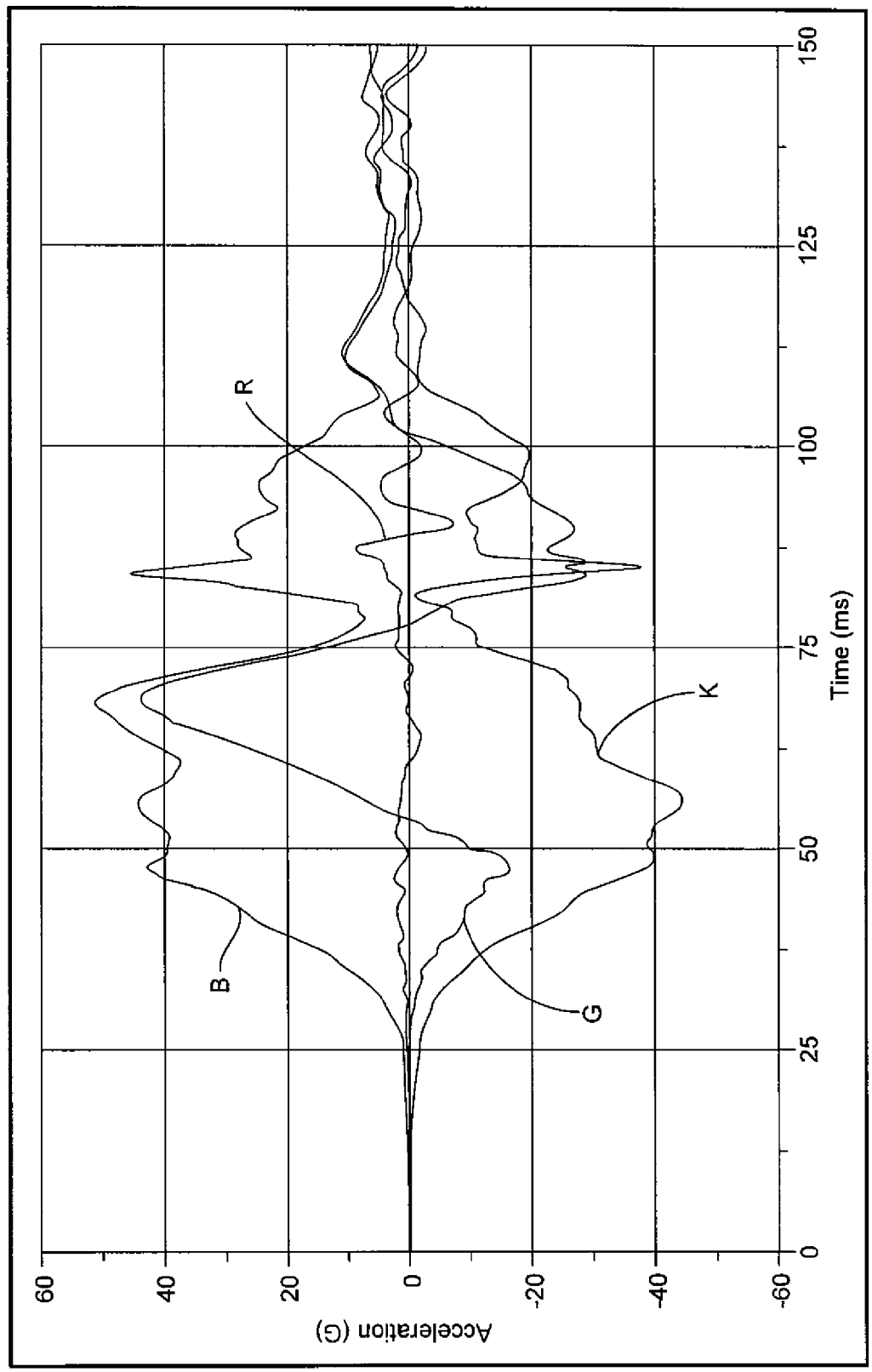
Figure 14:
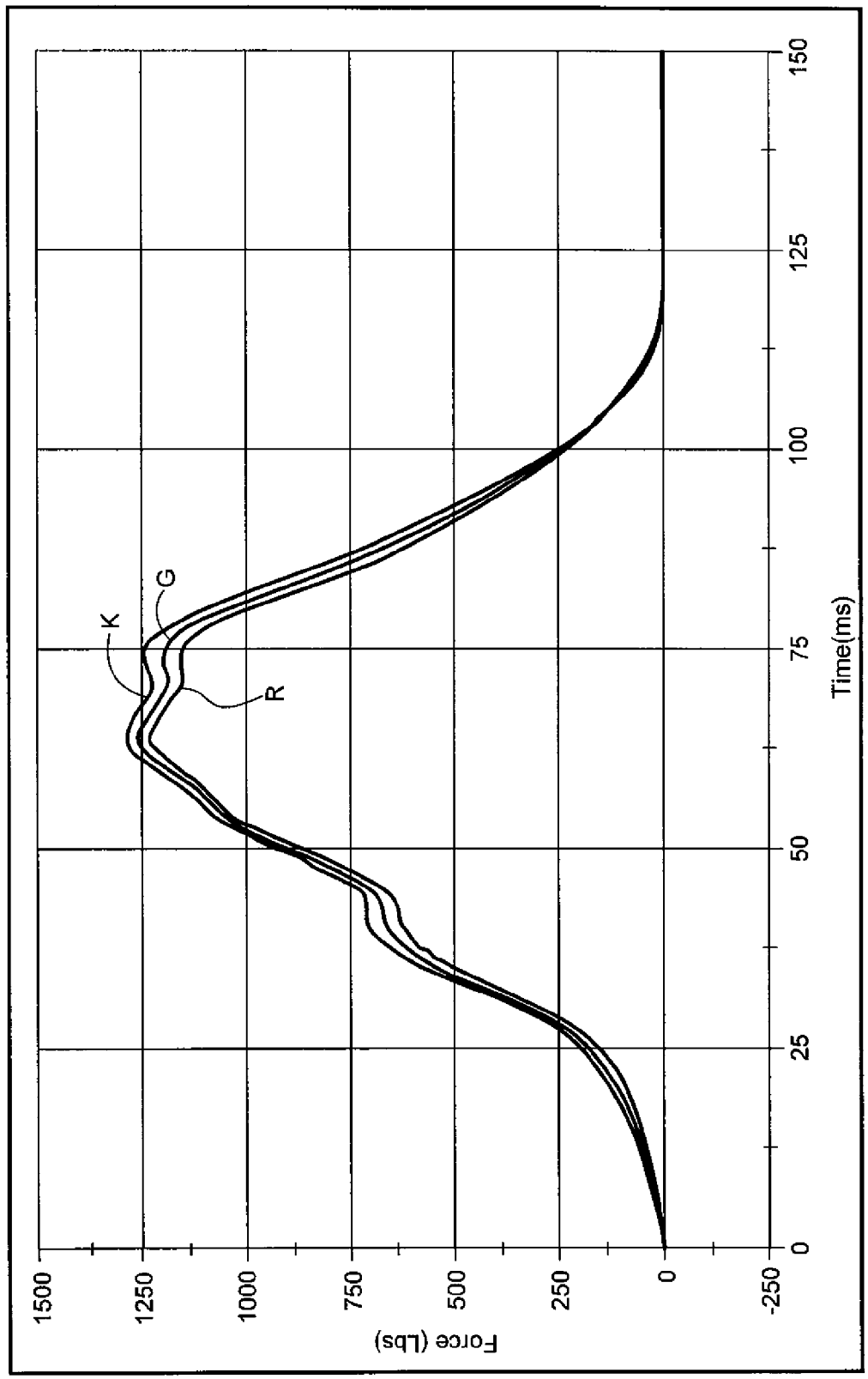

The present invention can be better understood with regard to examples of crash data as shown in FIGS. 7 through 14. In FIGS. 7 through 10, line G represents force transmitted in the vertical direction; line R represents force transmitted in the side-to-side direction; line K represents force transmitted in the forward direction; and line B represents the sum of the force vectors represented by G, R, and K. The sled acceleration pulse is depicted in FIG. 7 and FIG. 11. The forces acting on a child's head are depicted in FIG. 8 and FIG. 12. The forces acting on the child's chest are depicted in FIG. 9 and FIG. 13. The forces acting on the child about the belt 64 are depicted in FIG. 10 and FIG. 14.

First, a conventional child seat according formed according to the prior art was subjected to a standard test and data obtained therefrom is shown in FIGS. 7 through 10. As shown in FIG. 9, the sum of the forces transmitted through the chest had a maximum force of 66.6 g-forces. Then, a child seat formed in accordance with the present invention was subjected to the same standard test and data obtained therefrom is shown in FIGS. 11 through 14. As shown in FIG. 13, the sum of the forces transmitted through the chest had a maximum force of 49.2 g-forces. It is believed that the difference of about 17 g-forces between the sum of the forces transmitted through the chest in these two tests can be attributed to the presence of the first crush region 82 and the second crush region 84 in the second child seat tested.

The data obtained for the conventional child safety seat as shown in FIGS. 5-8 was conducted with a delta V of 13.30 m/s or 29.75 MPH, having a sled impact velocity of 51.882 MPH and HIC number of 755. The G forces acted pm the chest were 66.6 Gs. The weight of the sled used in the crash was 50 lbs and having a belt tension of 15 lbs. The test was conducted at a temperature of 22.6° C. with a humidity of 24.6%.

The data obtained for the conventional child safety seat as shown in FIGS. 9-12 was conducted with a delta V of 13.29 m/s or 29.73 MPH, having a sled impact velocity of 52.247 MPH and HIC number of 667. The G forces acted pm the chest were 49.2 Gs. The weight of the sled used in the crash was 50 lbs and having a belt tension of 15 lbs. The test was conducted at a temperature of 22.5° C. with a humidity of 27.5%

In the illustrated embodiment, the geometry of the seat bottom is such that first crush region 82 and end stop region 78 are separated by a dividing wall 79 that is generally perpendicular to the outer surface of the child seat 20 that is defined by the crush region 82 and the outer surface of the bottom of the child seat that is defined by the end stop region 78. Alternatively, these outer surfaces could be generally coplanar or the dividing wall could be positioned relative to one or both of them. It should be appreciated that the crush region 82 can be configured that outer surfaces in the crush region 82 define a plurality of geometric features such as planes, curves, walls, ribs, pleats and the like.

In other embodiments, it may be possible that after the harness 22 pulls tight, the harness 22 applies a force to the end cap region end stop region 78. The end stop region 78 then transmits the force to the first crush region 82. When the force that is transmitted to the first crush region 82 reaches a predetermined minimum force, the first crush region 82 collapses or deforms. It should be appreciated that at least a fraction of force could be transmitted through the first crush region 82 to the second crush region 84 such that the second crush region collapses. In this manner, force that would have been transmitted to the child in the child seat 20 is instead absorbed by the deformation of the first and second crush regions 82, 84.

The foregoing has described a child safety seat for receiving and protecting children having a weight that falls within a wide range. The child safety seat includes an area configured to reduce impact energy transferred to a child having a weight near the low end of the range. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

The invention claimed is:

1. A child safety seat for securement to a vehicle seat, wherein the vehicle seat defines a backrest portion and a seat portion, the child safety seat comprising:

a shell of material comprising a first shell thickness, the shell defining a seat bottom and a seat back, wherein the seat bottom defines a crush zone in the material; wherein the crush zone comprises an area of reduced material thickness relative to the first shell thickness and that is configured to deform at a controlled rate to absorb energy resulting from a first downward force applied via one or more of a child seat occupant and the seat back and a second upward force exerted on the seat bottom of the shell of the child safety seat from the seat portion of the vehicle seat during a sudden deceleration when the child safety seat is in a generally upright position of use; and a harness assembly for restraining the child seat occupant in the child safety seat.

2. The child safety seat according to claim 1, wherein the crush zone further defines a first crush region formed proximate at least one opening on a bottom surface of the seat bottom for receiving the harness assembly.

3. The child safety seat according to claim 2, wherein the first crush region has a thickness between about 0.020 inches and about 0.065 inches.

4. The child safety seat according to claim 3, wherein the first crush region has a thickness between about 0.025 inches and about 0.060 inches.

5. The child safety seat according to claim 4, wherein the first crush region has a thickness between about 0.030 inches and about 0.055 inches.

6. The child safety seat according to claim 2, wherein the crush zone further defines a second crush region formed on at least one outwardly facing side of the seat bottom.

7. The child safety seat according to claim 6, wherein the material thickness of the first crush region and the second crush region are different, and wherein the first crush region and second crush region are configured to cooperate to deform at a controlled rate to absorb energy resulting from the force.

8. The child safety seat according to claim 1, wherein the shell is blow molded.

9. The child safety seat according to claim 1 further comprising a means for receiving a latching assembly of a vehicle to secure the child safety seat to a seat of the vehicle in a secure configuration, wherein the child safety seat translates forward and the seat bottom of the shell of the child safety seat translates downward toward the seat portion of the vehicle seat as a result of the sudden deceleration and the secure configuration.

10. The child safety seat according to claim 1, wherein the crush zone is further configured to deform at a controlled rate to absorb energy resulting from a second generally upward force resulting from the harness.

11. A shell of material comprising a first shell thickness, the shell for a child safety seat for securement to a vehicle seat, wherein the vehicle seat defines a backrest portion and a seat portion, the shell defining a seat bottom and a seat back, wherein the seat bottom defines a crush zone in the material, the crush zone comprising an area of reduced material thickness relative to the first shell thickness and that is configured to deform at a controlled rate to absorb energy resulting from a first downward force applied via one or more of a child seat occupant and the seat back and a second upward force exerted on the seat bottom of the shell from the seat portion of the vehicle seat during a sudden deceleration when the child safety seat is in a generally upright position of use.

12. The shell according to claim 11, wherein the crush zone further defines a first crush region formed proximate at least one opening on a bottom surface of the seat bottom.

13. The shell according to claim 12, wherein the first crush region has a thickness between about 0.020 inches and about 0.065 inches.

14. The shell according to claim 13, wherein the first crush region has a thickness between about 0.025 inches and about 0.060 inches.

15. The shell according to claim 14, wherein the first crush region has a thickness between about 0.030 inches and about 0.055 inches.

16. The shell according to claim 12, wherein the crush zone further defines a second crush region formed on at least one outwardly facing side of the seat bottom.

17. The shell according to claim 16, wherein the material thickness of the first crush region and the second crush region are different, and wherein the first crush region and second crush region are configured to cooperate to deform at a controlled rate to absorb energy resulting from the force.

18. The shell according to claim 11, wherein the shell is blow molded.

19. The shell according to claim 11 further comprising a means for receiving a latching assembly of a vehicle to secure the shell to a seat of the vehicle in a secure configuration, wherein the shell undergoes the generally downwardly extending force of the seat bottom as a result of a force from the impact and the secure configuration.

20. The shell according to claim 11, wherein the shell is configured to interact with a harness proximate the crush zone, and wherein the crush zone is further configured to deform at a controlled rate to absorb energy resulting from a second generally upward force resulting from the harness.

* * * * *